Feb. 1, 1949.  E. HART  2,460,418
ELECTRIC MOTOR

Filed Aug. 18, 1944  2 Sheets-Sheet 1

Edward Hart
INVENTOR.

BY
ATTORNEY.

Feb. 1, 1949.  E. HART  2,460,418
ELECTRIC MOTOR
Filed Aug. 18, 1944  2 Sheets-Sheet 2

Edward Hart
INVENTOR.
BY
ATTORNEY.

Patented Feb. 1, 1949

2,460,418

UNITED STATES PATENT OFFICE 2,460,418

ELECTRIC MOTOR

Edward Hart, San Marino, Calif., assignor to A. O. Smith Corporation, Milwaukee, Wis., a corporation of New York Application August 18, 1944, Serial No. 550,023

10 Claims. (Cl. 172—36)

This invention relates to electric motors and has been applied to the construction of motors employed in centrifugal pump units wherein the motor is at least partially cooled by flowing therethrough a part of the pumped fluid.

Such a motor pump unit is described in the co-pending application of the present inventor, Serial No. 534,035, filed May 4, 1944, now abandoned, for Motor pump unit.

One of the difficulties encountered in the use of motor pump units of this type lies in the injury to various parts such as the insulation of the stator windings when pumping hot or corrosive fluids.

The principal object of the invention is to more effectively protect the stator and its windings from the fluid being circulated through the motor for cooling the same.

Another object is to provide auxiliary cooling means for the stator separate from that for the rotor.

Another object is to provide a more compact unit and facilitate assembly of the same.

According to the invention the stator and its windings are contained in a cartridge-like package which may be readily assembled and sealed in the motor housing. Outer connections are provided in the cartridge wall and motor housing for circulating a separate cooling medium around the stator.

The invention is illustrated in the accompanying drawings in which:

Figure 1 is an axial section through a motor pump unit showing the application of the invention to a unit like that described in applicant's co-pending application above referred to;

Figure 1:
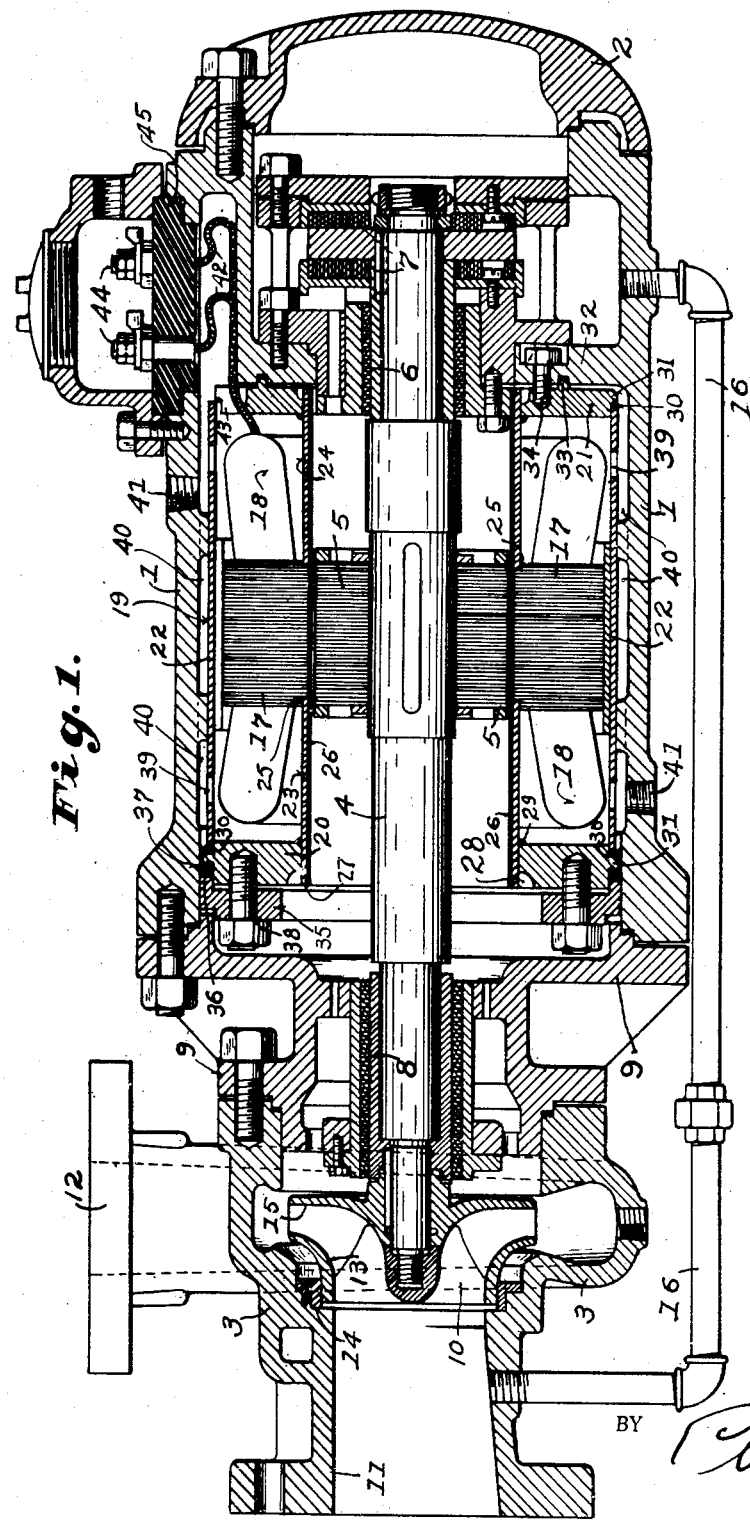
Figure 2:
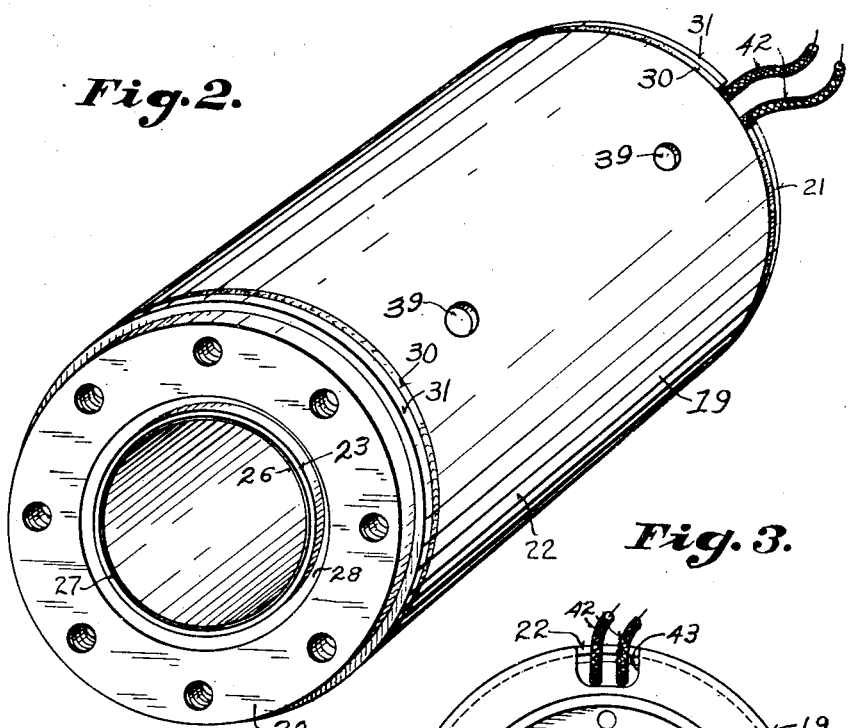
Fig. 2 is a perspective view of the stator package prior to assembly in the motor housing.
Figure 3:
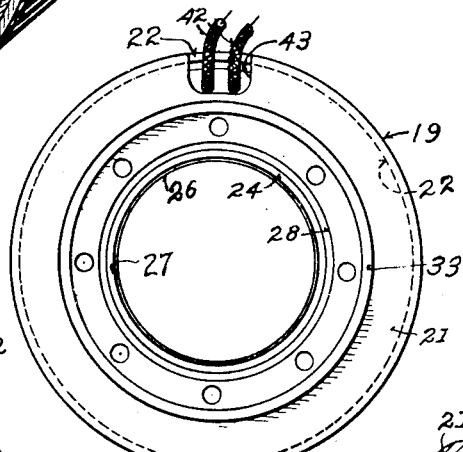
Fig. 3 is a rear end view of the package.
Figure 4:
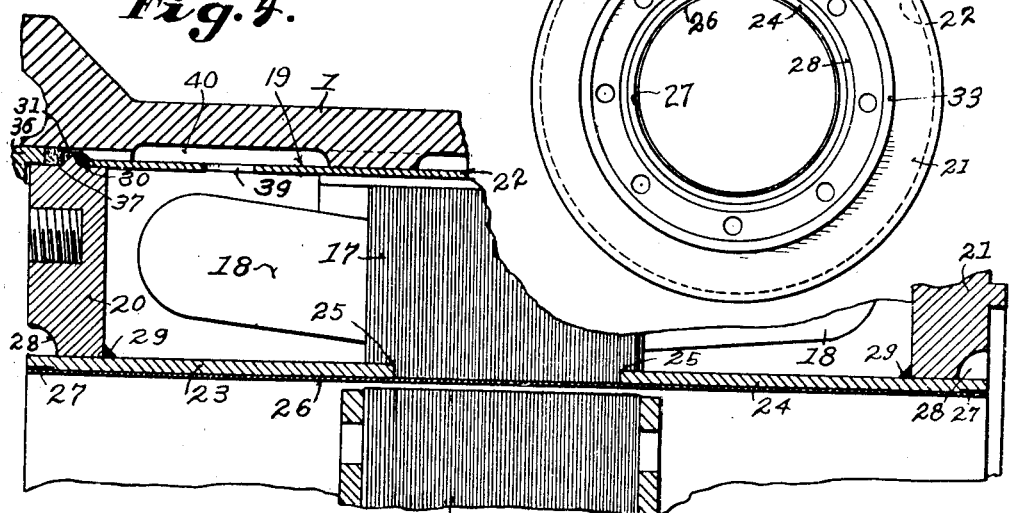
Fig. 4 is an enlarged detail view showing the construction of the inner liner.

The unit comprises, in general, a cylindrical motor housing 1 with a removable rear end cap 2 and a pump housing 3 secured to its forward end.

The motor shaft 4 carrying the rotor 5 extends axially of housing 1 and is supported by radial and thrust bearings 6 and 7, respectively, in the rear end of the housing, and by the radial bearing 8 in an adapter head 9 secured between the forward end of housing 1 and the pump housing 3.

An impeller 10 is secured on the forward end of the shaft in the pump housing 3, and the latter provides an axial inlet 11 and a volute lateral discharge outlet 12 for the impeller.

The forward shroud 13 of the impeller 10 is sealed between the high pressure and low pressure sides by the wear plate ring 14. The rear shroud 15 of the impeller 10 is open on its rear face to allow pumped fluid to pass inwardly and rearwardly through the motor chamber, submerging and cooling rotor 5 and bearings 6, 7 and 8. Circulation of the cooling medium is obtained by a conduit 16 which returns a predetermined restricted amount of the pumped fluid from the rear end of the motor chamber to the pump inlet 11.

In accordance with the present invention, the stator 17 and its windings 18 are enclosed in a package 19 comprising a pair of end plates 20 and 21 joined by an outer cylindrical ring 22 and a pair of inner cylindrical rings 23 and 24 which bridge the gap between the corresponding end plates 20 and 21 and the stator laminations 17.

The inner ends of rings 23 and 24 are secured in notches 25 at the inner corners of the stator 17. A thin foil-like cylinder of corrosion resistant metal 26 lines the inside opening through the package and extends throughout the length of the package, being backed by the respective rings 23 and 24 and by the inner face of the stator laminations 17.

The lining 26 is secured in place by silver solder 27 or the like at each end, sealing the same to the outer ends of the respective rings 23 and 24. To facilitate the silver soldering operation at the ends, the end plates are recessed at 28, whereby the ends of the sleeve-like rings 23 and 24 can be readily heated for soldering purposes.

In assembling the package, the rings 23 and 24 are first secured in the respective end plates 20 and 21 by fillet welds 29. Then the rings are assembled with the stator 17 by locating the inner ends of the rings in the respective notches 25 in the stator. In making this assembly the stator 17 has the outer sleeve 22 secured to its outer surface, and when the end plates 20 and 21 come to final location a portion of each enters the respective end of sleeve 22 like a plug. The package is secured in assembled relation by welds 30 between the end edges of sleeve 22 and circumferential ridges 31 on the respective plates 20 and 21.

After the package is assembled as described the lining 26 is inserted and silver soldered in place. The lining sleeve is preferably of monel metal or of some non-magnetic corrosion resistant metal or material. It should be very thin in order not to interfere with the flux passing from the stator to the rotor of the motor. A thickness of from ten to twenty-five thousandths of an inch has been found to be satisfactory. The rings 23 and 24 serve to support the lining against fluid pressures.

The package 19 is assembled in the housing 1 by endwise movement from the front end. The rear end plate 21 is sealed against an end flange 32 on the housing by a circular packing gland 33. Bolts 34 passing through flange 32 and into end plate 21 secure the package in place and against turning. The package is sealed to the housing 1 at its forward end by the ring 35 which has a flange 36 entering a space between the end plate 20 and the housing for compressing the packing ring or gasket 37, the ridge 31 serving to back the gasket against the longitudinal pressure of the flange. The ring 35 is secured to end plate 20 by bolts 38.

The outer sleeve 22 has openings 39 therein for receiving cooling fluid from the circumferential radial spaces 40 between the sleeve and housing 1. Openings 41 in the housing are adapted for supplying cooling fluid to the spaces 40 and stator. The cooling fluid thus supplied to the stator should not be corrosive and is entirely independent of that passing through the rotor chamber of the motor and the bearings.

The electrical connections 42 for the stator windings 18 pass out of the package 19 through an opening 43 in the rear end plate 21 and connect with binding posts 44 in a sealed insulating plate 45 secured in a side opening in housing 1.

Various embodiments of the invention may be employed within the scope of the claims.

I claim:

1. In a rotary electric motor, a stator, stator windings therefor, a housing for the motor, a separate package enclosure containing the stator and its windings and removably secured in said motor housing, means for sealing the ends of said package in said housing, means to pass a cooling fluid through the motor around the rotor, and means to pass a different cooling fluid through said stator package, said end seals for the package separating the respective cooling media.

2. In a rotary electric motor, a stator, stator windings therefor, a housing for the motor, a separate package enclosure containing the stator and its windings and removably secured in said motor housing, the inside surface of said package being cylindrical and comprising the stator laminations and a sleeve of corresponding inside diameter interlocked therewith and extending from each end thereof, and a foil-like corrosion resistant metal lining for the entire inner surface of the package.

3. In a motor, a foil-like corrosion resistant non-magnetic lining for the rotor opening in the stator laminations, and means supporting said lining against fluid pressures, said means comprising sleeves extending from the stator laminations to substantially the opposite ends of the motor, and said lining being of monel-metal and being sealed at its ends by silver solder to said sleeves, the ends of said sleeves and lining being exposed and free from direct contact with heat conductive material to facilitate the soldering thereof without injury to the lining.

4. In a rotary electric motor, a stator, stator windings therefor, a housing for the motor, a separate package enclosure containing the stator and its windings and removably secured in said motor housing, means for sealing the ends of said package in said housing, means to pass a cooling fluid through the motor around the rotor, and means to pass a cooling fluid through said stator package.

5. In an electric motor adapted to be submerged in a corrosive liquid and having a stator composed of a core with energizing windings, a separate removable stator assembly constituting a package with the core and winding enclosed therein for insertion as a unit into the motor housing, and means to seal the ends of the package against the housing, the outer walls of the package having openings into the motor housing, and the inner walls of the package constituting a leak-proof seal separating the stator from the rotor and from the liquid surrounding the rotor.

6. In a rotary electric motor including a stator, stator windings therefor, a housing for the motor, and end closures for said housing adapted to provide bearing supports for the rotor of the motor, a separate package enclosure containing the stator and its windings removably secured in said motor housing, the inside surface of said package being cylindrical and covered by a cylindrical lining of foil-like thickness of corrosion resistant material sealed at the ends of the package, means for removably securing one end of said package to one of said closures, and means to allow limited longitudinal movement of the other end of said package within said housing to protect said lining against damage as by thermal expansion and contraction.

7. In a rotary electric motor including a stator, stator windings therefor, a housing for the motor, and end closures for said housing adapted to provide bearing supports for the rotor of the motor, a separate package enclosure containing the stator and its windings removably secured in said motor housing, the inside surface of said package comprising the stator laminations and a sleeve interlocked therewith and extending from each end thereof and being covered by a cylindrical lining of foil-like thickness of corrosion resistant material sealed at the ends of the package, means for removably securing and sealing one end of said package to one of said closures and means to allow limited longitudinal movement of the other end of said package within said housing to protect said lining against damage as by thermal expansion and contraction and to seal said end to protect said stator and windings against corrosive liquids, the outer wall of said package being open to the inside of said housing between said seals.

8. In a rotary electric pump motor for pumping corrosive liquids including a rotor adapted to be cooled by the pumped liquids, a stator, stator windings and electrical connections therefor, a housing for the motor, and end closures for said housing adapted to provide bearing supports for said rotor, a separate corrosion resistant package enclosure containing the stator and its windings and having openings on the outside thereof for said electrical connections and for the circulation of a separate cooling medium for said stator, means for removably securing and sealing one end of said package to one of said closures and means to allow limited longitudinal movement of the other end of said package within said housing and to seal said end to protect said windings and electrical connections therefor within the housing against corrosive liquids.

9. In a rotary electric motor and pump unit including a rotor, a stator, stator windings therefor, a housing for the motor, and end closures for said housing adapted to provide bearing supports for said rotor, a separate package enclosure containing the stator and its windings to be removably secured in said motor housing, the inside surface of said package being cylindrical and covered by a cylindrical lining of foil-like thickness of corrosion resistant material sealed at the ends of the package, means to pass the pumped fluid through the motor around said rotor, separate means to pass a cooling fluid through the outer walls of said stator package and housing, means securing and sealing one end of said package to one of said end closures, and ring seal means providing limited longitudinal movement of the other end of said package within said housing to protect said lining against damage by thermal expansion and contraction and to seal said cooling fluid from the pumped liquids.

10. In a rotary electric motor, a stator, stator windings therefor, a substantially cylindrical housing for the motor having end closures adapted to provide bearing supports for the rotor of the motor, a packaged unit for containing the stator and its windings, said unit having a cylindrical outer wall and a cylindrical inner wall formed by the stator laminations and a sleeve interlocked therewith and extending from each end thereof and end walls with all of said walls being separate and independent of the motor housing and said unit being removably secured in said housing, means for securing one end of said packaged unit to one of said end closures, and means for sealing the other end within the housing.

EDWARD HART.

REFERENCES CITED

The following references are of record in the file of this patent:

UNITED STATES PATENTS

| Number | Name | Date |
| --- | --- | --- |
| 1,269,909 | Cooper | June 18, 1916 |
| 1,675,419 | Meyers | July 3, 1928 |
| 1,875,207 | Apple | Aug. 30, 1932 |
| 2,023,259 | Anderson | Dec. 3, 1935 |
| 2,246,777 | Bordeaux et al. | June 24, 1941 |

FOREIGN PATENTS

| Number | Country | Date |
| --- | --- | --- |
| 594,794 | Germany | Oct. 3, 1934 |